(12) United States Patent
Lucas

(10) Patent No.: US 8,147,575 B2
(45) Date of Patent: Apr. 3, 2012

(54) MULTI-STAGE OIL SEPARATION SYSTEM INCLUDING A CYCLONIC SEPARATION STAGE

(75) Inventor: Michael J. Lucas, Mooresville, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 321 days.

(21) Appl. No.: 12/556,212

(22) Filed: Sep. 9, 2009

(65) Prior Publication Data

US 2011/0056379 A1   Mar. 10, 2011

(51) Int. Cl.
*B01D 50/00* (2006.01)
*B01D 45/12* (2006.01)

(52) U.S. Cl. ............... 55/337; 55/343; 55/349; 55/426; 55/447; 55/466; 55/476

(58) Field of Classification Search ............ 55/337, 55/343, 349, 416, 426, 447, 466, 476
See application file for complete search history.

(56) References Cited

U.S. PATENT DOCUMENTS

| | | |
|---|---|---|
| 2,511,967 A | 6/1950 | Campbell |
| 3,086,343 A | 4/1963 | Stern |
| 3,324,634 A | 6/1967 | Brahler et al. |
| 3,339,349 A | 9/1967 | Farnum |
| 3,386,230 A | 6/1968 | Riesberg et al. |
| 3,616,617 A | 11/1971 | Groote |
| 3,707,068 A | 12/1972 | Bloom |
| 4,323,375 A | 4/1982 | Chang |
| 4,506,523 A | 3/1985 | DiCarlo et al. |
| 4,690,759 A * | 9/1987 | Mandy ......................... 210/304 |
| 4,767,424 A | 8/1988 | McEwan |
| 5,158,585 A | 10/1992 | Saho et al. |
| 5,170,640 A | 12/1992 | Heitmann et al. |
| 5,271,245 A | 12/1993 | Westermeyer |
| 6,251,168 B1 * | 6/2001 | Birmingham et al. ......... 95/268 |
| 6,309,436 B1 | 10/2001 | Holch |
| 6,709,476 B2 | 3/2004 | Kitano et al. |
| 6,827,753 B2 | 12/2004 | Matsubara et al. |
| 6,858,067 B2 | 2/2005 | Burns et al. |
| 6,942,709 B2 | 9/2005 | Trautmann et al. |

(Continued)

FOREIGN PATENT DOCUMENTS

EP   0438251 A1   7/1991

(Continued)

*Primary Examiner* — Robert A Hopkins
(74) *Attorney, Agent, or Firm* — Michael Best & Friedrich LLP

(57) ABSTRACT

A separator for separating a liquid-gas flow into a liquid and a compressed gas includes a housing that defines an inner space and that is adapted to contain the full pressure of the compressed gas. The housing includes a liquid-gas inlet, a liquid outlet, and a gas outlet. A first stage separator is positioned to receive the liquid-gas flow from the inlet. The first stage separator is operable to separate a first portion of the liquid from the liquid-gas flow. A second stage separator includes a swirl vane separator and is positioned to receive the liquid-gas flow from the first stage separator and is operable to separate a second portion of the liquid from the liquid-gas flow. A third stage separator is positioned to receive the liquid-gas flow from the swirl vane separator and is operable to separate a third portion of the liquid from the liquid-gas flow. The first stage separator, the second stage separator, and the third stage separator are completely contained within the housing.

20 Claims, 12 Drawing Sheets

U.S. PATENT DOCUMENTS

| | | |
|---|---|---|
| 7,144,437 B2 | 12/2006 | Christiansen et al. |
| 7,445,653 B2 | 11/2008 | Trautmann et al. |
| 7,488,361 B2 | 2/2009 | Larnholm |
| 2003/0221398 A1 | 12/2003 | Trautmann et al. |
| 2006/0123744 A1 | 6/2006 | Read |
| 2008/0034717 A1 | 2/2008 | Yun |
| 2008/0250772 A1 | 10/2008 | Becker et al. |
| 2010/0242422 A1 | 9/2010 | Heikamp |

FOREIGN PATENT DOCUMENTS

| | | |
|---|---|---|
| JP | 5141815 A | 6/1993 |
| JP | 7218049 A | 8/1995 |
| JP | 8159619 A | 6/1996 |

* cited by examiner

US 8,147,575 B2

MULTI-STAGE OIL SEPARATION SYSTEM INCLUDING A CYCLONIC SEPARATION STAGE

BACKGROUND

The present invention relates to multi-stage oil separators, and more particularly to multi-stage oil separators contained within a single housing and including at least one stage of cyclonic separation.

Some air compressor systems use oil to lubricate the compressor, remove heat produced during the compression process, and to provide better seals between the compressor elements to improve compressor efficiency. One example of such a compressor system employs one or more oil-flooded screw compressors.

Operation of oil-flooded compressors produces compressed air that is mixed with oil. It is necessary to separate the oil from the air before the air can be used. Typically, the oil is separated and returned to the compressor for reuse. In some systems, the oil is filtered, or cooled before it is returned to the compressor.

SUMMARY

In one construction, the invention provides a separator for separating a liquid-gas flow into a liquid and a compressed gas. The separator includes a housing that defines an inner space and that is adapted to contain the full pressure of the compressed gas. The housing includes a liquid-gas inlet, a liquid outlet, and a gas outlet. A first stage separator is positioned to receive the liquid-gas flow from the inlet. The first stage separator is operable to separate a first portion of the liquid from the liquid-gas flow. A second stage separator includes a swirl vane separator and is positioned to receive the liquid-gas flow from the first stage separator and is operable to separate a second portion of the liquid from the liquid-gas flow. A third stage separator is positioned to receive the liquid-gas flow from the swirl vane separator and is operable to separate a third portion of the liquid from the liquid-gas flow. The first stage separator, the second stage separator, and the third stage separator are completely contained within the housing.

In another construction, the invention provides a separator for separating a liquid-gas flow into a liquid and a compressed gas. The separator includes a housing that defines an inner space and is adapted to contain the full pressure of the compressed gas. The housing includes a liquid-gas inlet, a liquid outlet, and a gas outlet. A first stage separator includes a cyclonic separator formed as part of the housing. The cyclonic separator is operable to separate a first portion of the liquid from the liquid-gas flow. A second stage separator includes a swirl vane separator positioned to receive the liquid-gas flow from the first stage separator and operable to separate a second portion of the liquid from the liquid-gas flow. A third stage separator includes a plurality of individual cyclone separators positioned to receive the liquid-gas flow from the swirl vane separator and operable to separate a portion of the liquid from the liquid-gas flow.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
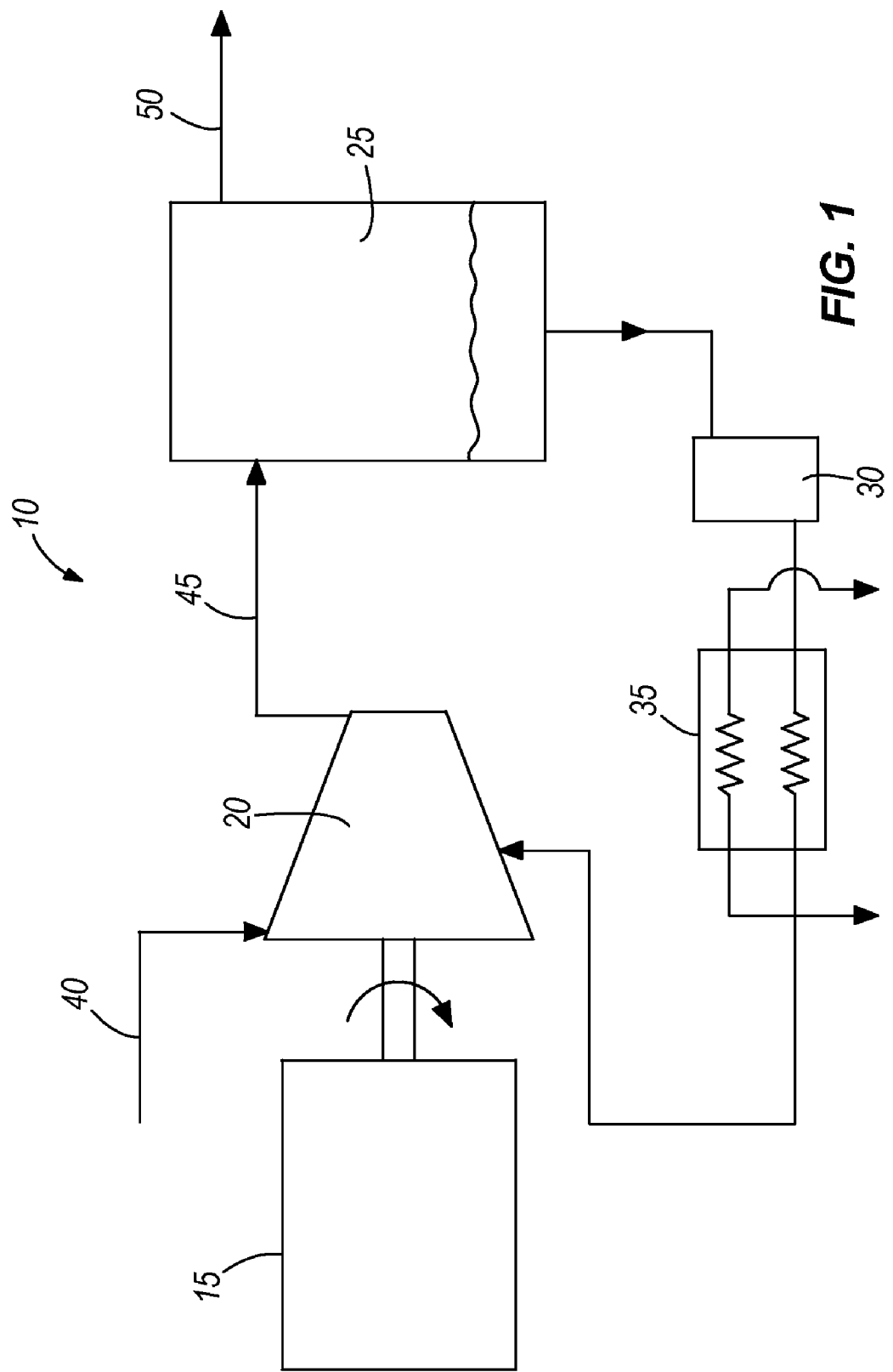
FIG. 1 is a schematic view of a compression system including a multi-stage oil separator.

FIG. 1 schematically illustrates a gas compression system 10 that operates to compress a gas such as air. The system includes a prime mover 15 that drives a compressor 20, an oil separator 25, a filter 30, and an oil cooler 35. In preferred constructions, a motor or engine is employed as the prime mover 15 with other devices also suitable for use as a prime mover 15.

The compressor 20 draws in air (or another gas) along an inlet path 40 and discharges the air at a higher pressure. In the illustrated construction, an oil-flooded compressor 20 such as an oil-flooded screw compressor is employed. Oil is provided to the compressor 20 to improve the seal between the compressing elements, to lubricate the compressing elements, and to remove heat produced during the compression process. The oil mixes with the air and is discharged as an air-oil mixture along an air-oil path 45.

The air-oil path 45 directs the air oil mixture to the separator 25 where the oil is separated from the air. The air exits the separator via an air outlet 50 and flows to a point of use. The oil exits the separator 25 and flows through the optional filter 30 and the optional oil cooler 35 before being redirected to the compressor 20 for reuse.

Figure 2:
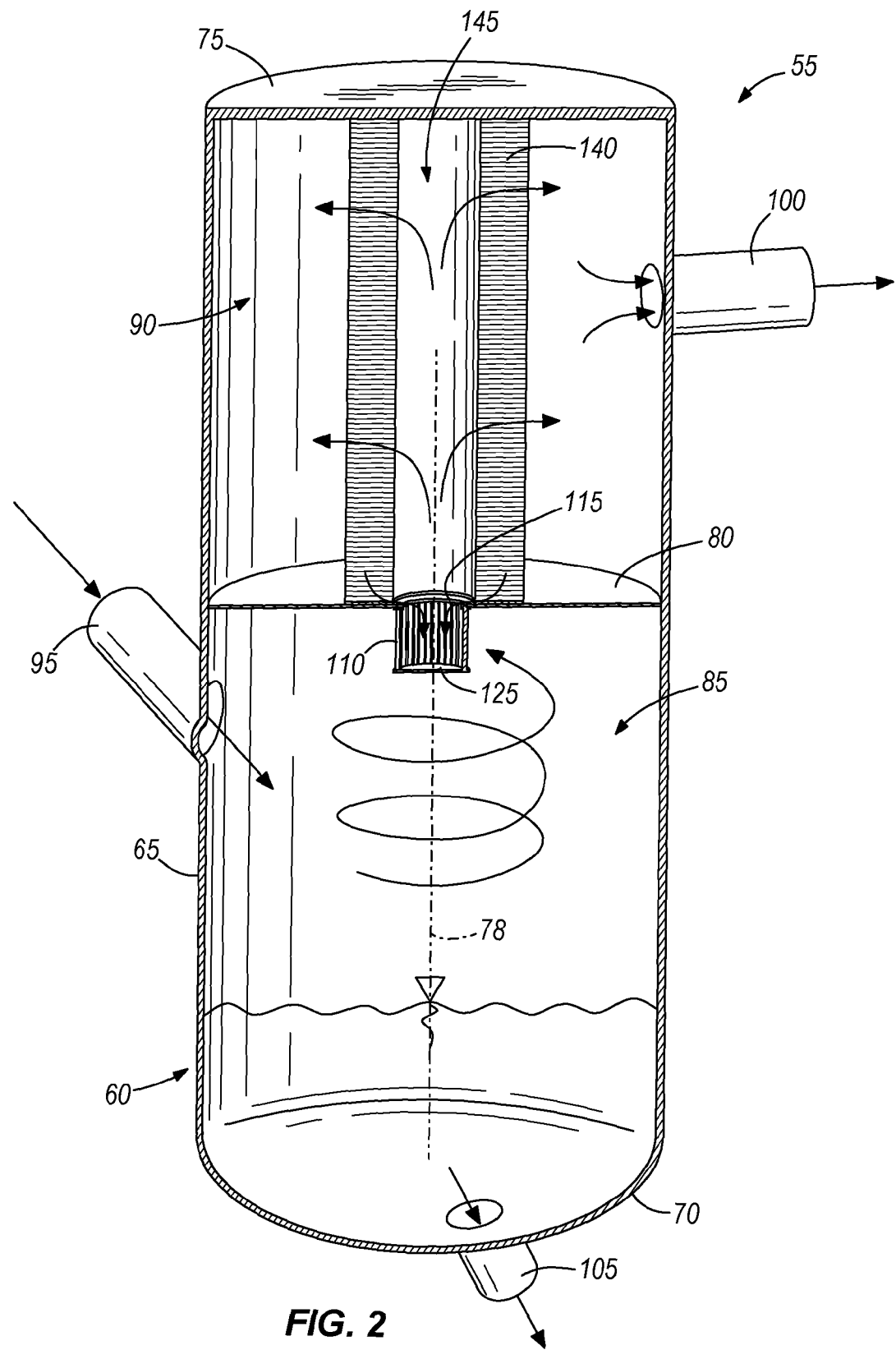
FIG. 2 is a section view of a multi-stage oil separator suitable for use with the compression system of FIG. 1.

FIG. 2 illustrates a multi-stage separator 55 suitable for use in the system 10 of FIG. 1. The separator 55 includes a housing 60 that contains all of the separating components and is suited to containing the full pressure of the compressed air from the compressor 20. In the illustrated construction, the housing 60 includes a cylindrical side wall 65, a bottom wall 70 that is domed, and a top wall 75 that is flat or planar. A longitudinal axis 78 extends from the bottom wall 70 to the top wall 75 along the center of the cylindrical side wall 65. A divider plate 80 is positioned within the housing 60 to divide the interior space into a first space 85 and a second space 90.

The housing 60 includes an inlet 95, an air outlet 100, and an oil outlet 105. The inlet 95 is positioned on the side of the housing 60 and is angled with respect to the longitudinal axis 78 of the housing 60. In preferred constructions, the inlet 95 is angled between about 10 and 30 degrees downward with respect to the longitudinal axis 78 with other angles being possible. In addition, the inlet 95 is arranged to discharge the air-oil mixture into the first space 85 of the housing 60 along a path that is substantially tangent to the cylindrical walls 65 or another circle centered on the longitudinal axis 78. Thus, the entry of the air-oil mixture into the first space 85 produces a vortex flow within the first space 85. The vortex flow forces heavier particles (oil) outward until they impinge upon the cylindrical walls 65. Some of the oil sticks to and flows down the walls 65 where it is collected in the bottom of the housing 60.

Figure 11:
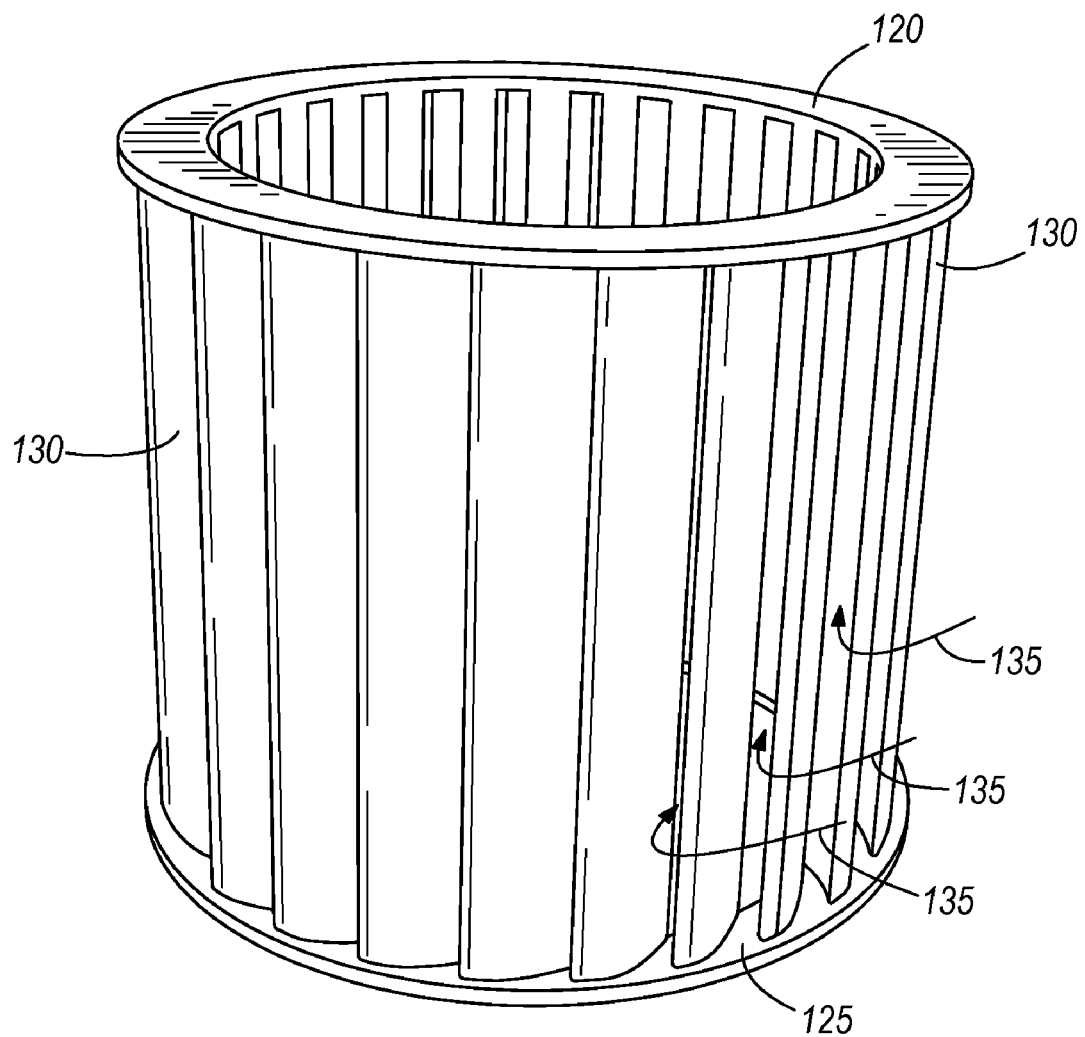
FIG. 11 is a perspective view of a swirl vane separator.

A swirl vane separator 110 is positioned adjacent an aperture 115 in the divider plate 80. In the illustrated construction, the aperture 115 is centrally-located, with other locations also being possible. The swirl vane separator 110, illustrated in FIG. 11 includes an upper ring 120, a lower ring 125, and a plurality of vanes 130 that extend between the upper ring 120 and the lower ring 125. The vanes 130 are arranged to define a plurality of flow paths 135 that do not intersect the longitudinal axis 78. Rather, the flow paths 135 are tangent a circle centered on the longitudinal axis 78. The vanes 130 are arranged to force the flow in a cyclonic direction that is opposite the cyclonic direction produced in the first space 85, with other arrangements that induce cyclonic flow in the same direction. For example, in the illustrated construction, the cyclonic direction in the first space 85 is counterclockwise when viewed from above. The flow vanes 130 are arranged to induce a cyclonic direction that is clockwise when viewed from above. This arrangement forces the flow of air-oil to make a direction change in excess of 90 degrees and preferably in excess of 135 degrees. The large change in direction forces more oil out of the air-oil flow. The oil impinges upon and sticks to the vanes 135. The oil then drains downward and drips into the bottom of the housing 60.

A coalescing filter 140 is positioned in the second space 90 adjacent the divider plate aperture 115. The coalescing filter 140 is annular and contacts the top surface 75 of the housing 60 to provide a seal therebetween. The air-oil mixture passes through the aperture 115 and enters a cylindrical space 145 defined within the annular coalescing filter 140. The air-oil mixture is forced through the coalescing filter 140 where most of the remaining oil is removed from the air. The oil drains out the bottom of the coalescing filter 140, through the aperture 115 and down to the bottom of the first space 85. The air exits the coalescing filter 140 and collects in the second space 90 between the coalescing filter 140 and the housing 60.

The air outlet 50 is positioned in the cylindrical wall 65 in the second space 90 such that air can exit the housing 60 after it passes through the coalescing filter 140. Oil drains to the bottom of the housing 60 where it is drained via the oil outlet 105 positioned in the bottom domed surface 70 of the housing 60.

Figure 3:
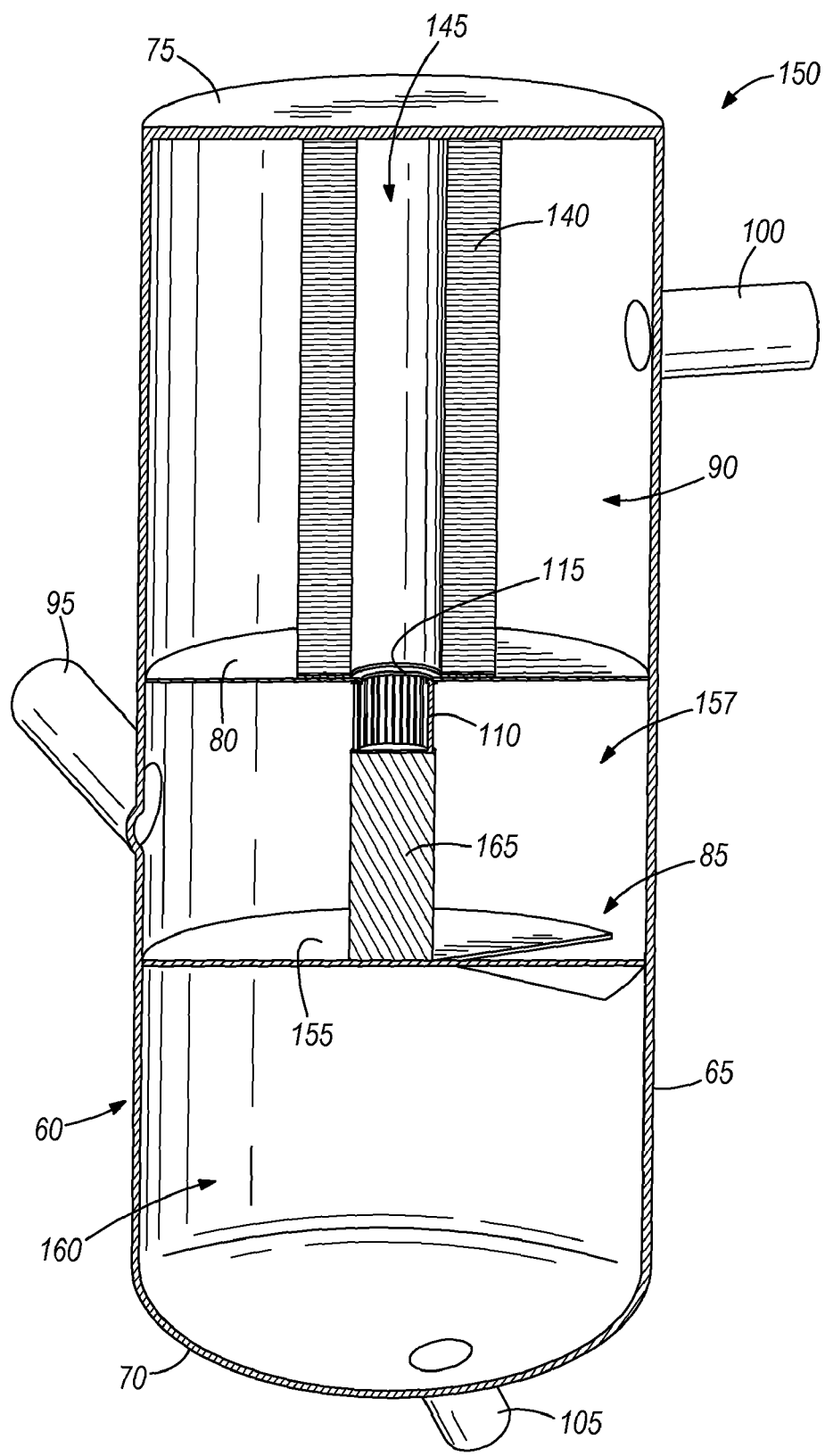
FIG. 3 is a section view of the multi-stage oil separator of FIG. 2 including a vortex isolation plate.

Turning to FIG. 3, a separator 150 similar to that of FIG. 2 is illustrated. The separator 150 includes a vortex isolation plate 155 that separates the first space 85 into an upper first space 157 and a lower first space 160. The vortex isolation plate 155 includes a downwardly facing portion 165 that allows oil collected in the upper first space 157 to drain into the lower first space 160.

The inlet 95 is positioned to discharge the air-oil mixture into the upper first space 157 as was described with regard to the construction of FIG. 2. The air-oil mixture flows in a vortex as was described with regard to FIG. 2. However, the vortex isolation plate 155 separates the vortex from the collected oil in the lower first space 160. This reduces the amount of re-entrainment that occurs as a result of the high velocity air-oil mixture passing over the collected oil in the bottom of the housing 60.

A center body 165 extends between the lower ring 125 of the swirl vane separator 110 and the vortex isolation plate 155. The center body 165 is cylindrical and similar in diameter to the swirl vane separator 110. In some constructions, the center body 165 defines a flow path that allows oil to drain downward through the center body 165 and directly into the lower first space 160. However, other constructions allow the oil to drain down the side of the center body 165. In still other constructions, the center body 165 is differently shaped (e.g., rectangular cross section, polygonal cross section, etc.) to enhance the separation of oil from air within the upper first space 157.

Figure 4:
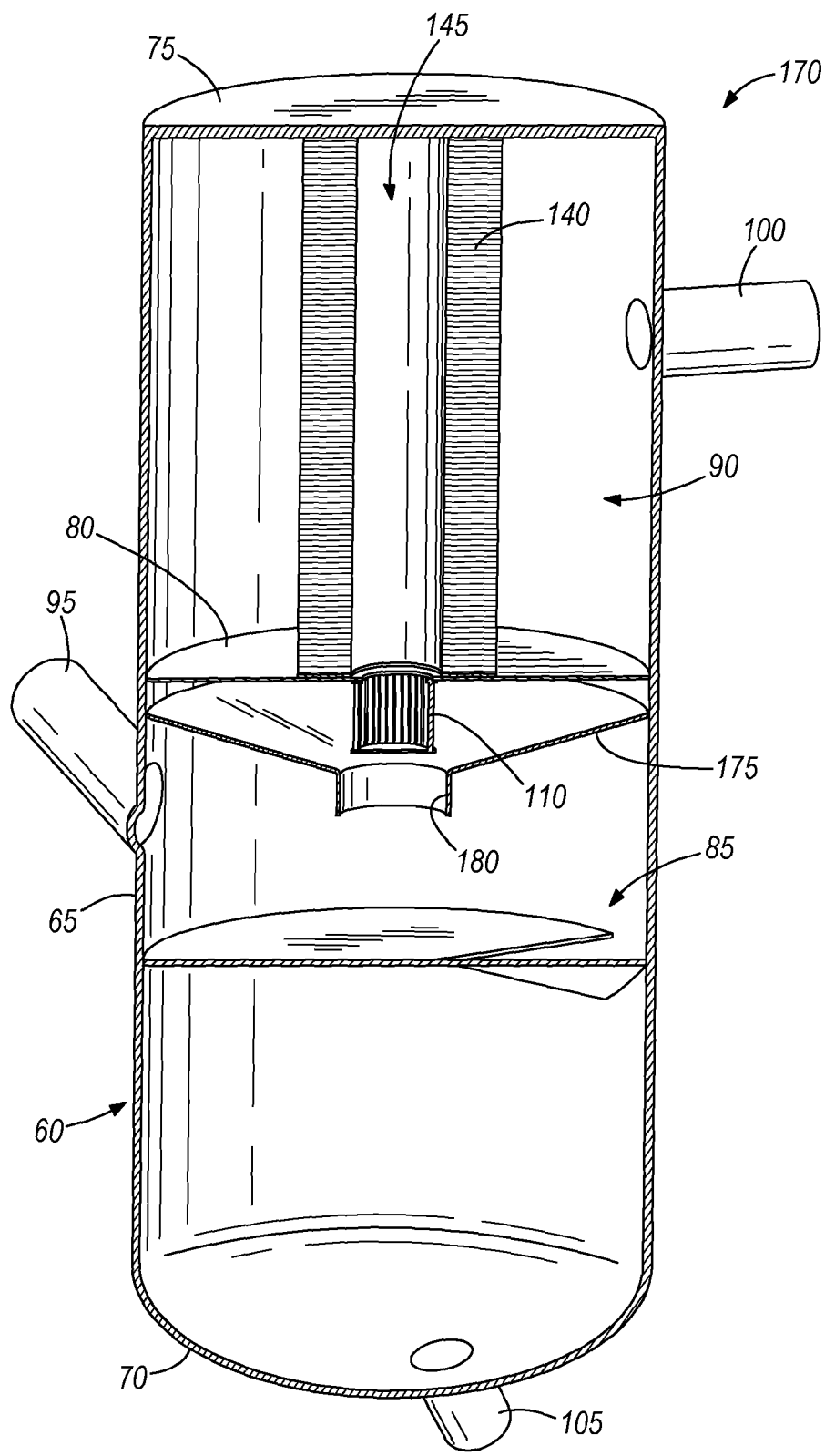
FIG. 4 is a section view of the multi-stage oil separator of FIG. 3 including a conical baffle.

FIG. 4 illustrates another construction of a separator 170 that is similar to the construction of FIG. 3 in that it includes a vortex isolation plate 155. However, in the construction of FIG. 4, the center body 165 of FIG. 3 is not employed. A conical baffle 175 is positioned near the swirl vane separator 110. The conical baffle 175 includes a central aperture 180 disposed beneath the swirl vane separator 110 that provides a path for air-oil to flow upward and oil to flow downward.

Figure 5:
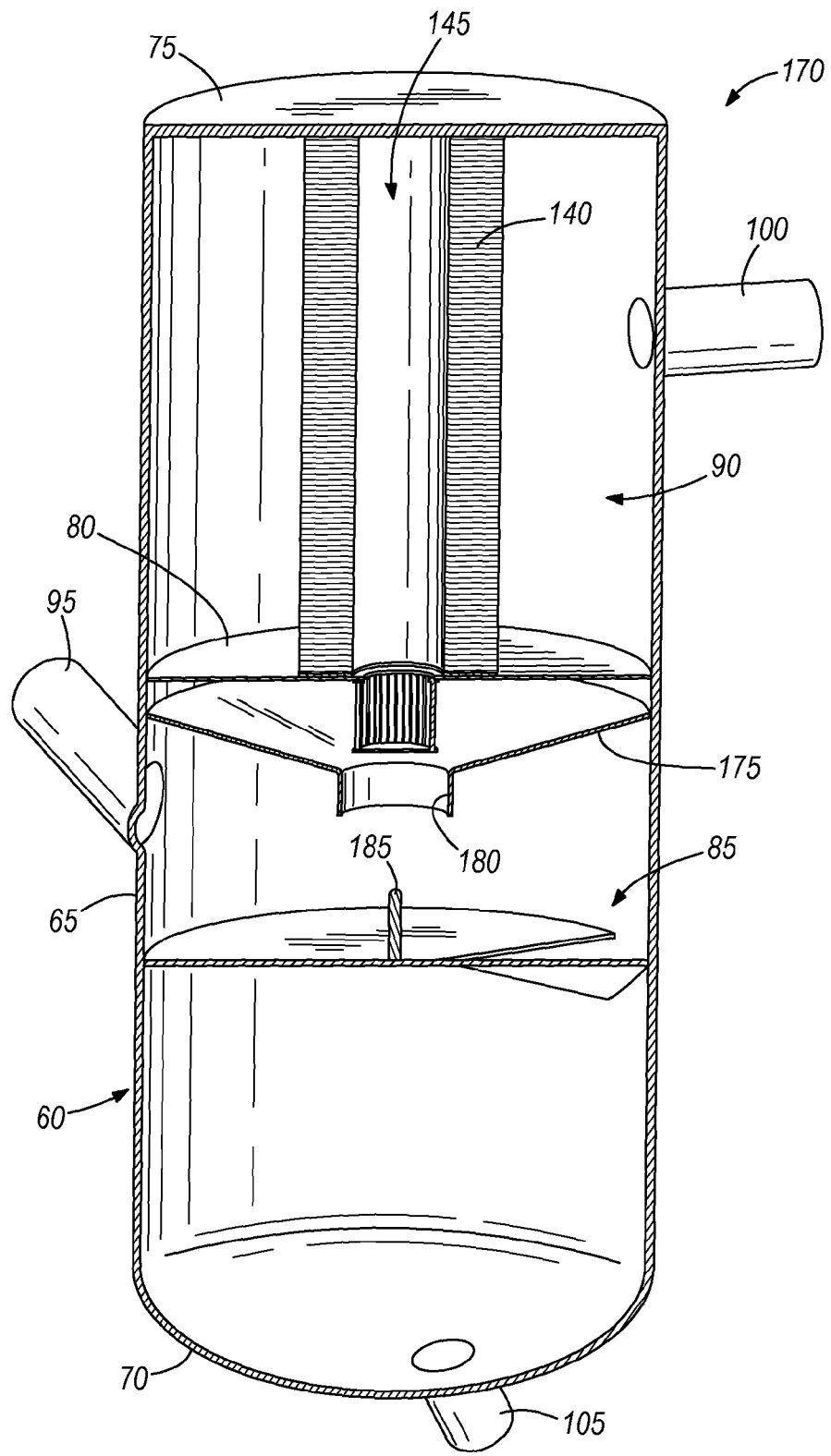
FIG. 5 is a section view of the multi-stage oil separator of FIG. 4 including a vortex stabilizer.

In some constructions, a vortex stabilizer 185 is added to the construction of FIG. 4. Such a construction is illustrated in FIG. 5. The vortex stabilizer 185 includes a cylindrical rod that extends upward from the center of the vortex isolation plate 155. The rod 185 acts on the air-oil flow to guide the flow into the desired cyclonic pattern.

Figure 6:
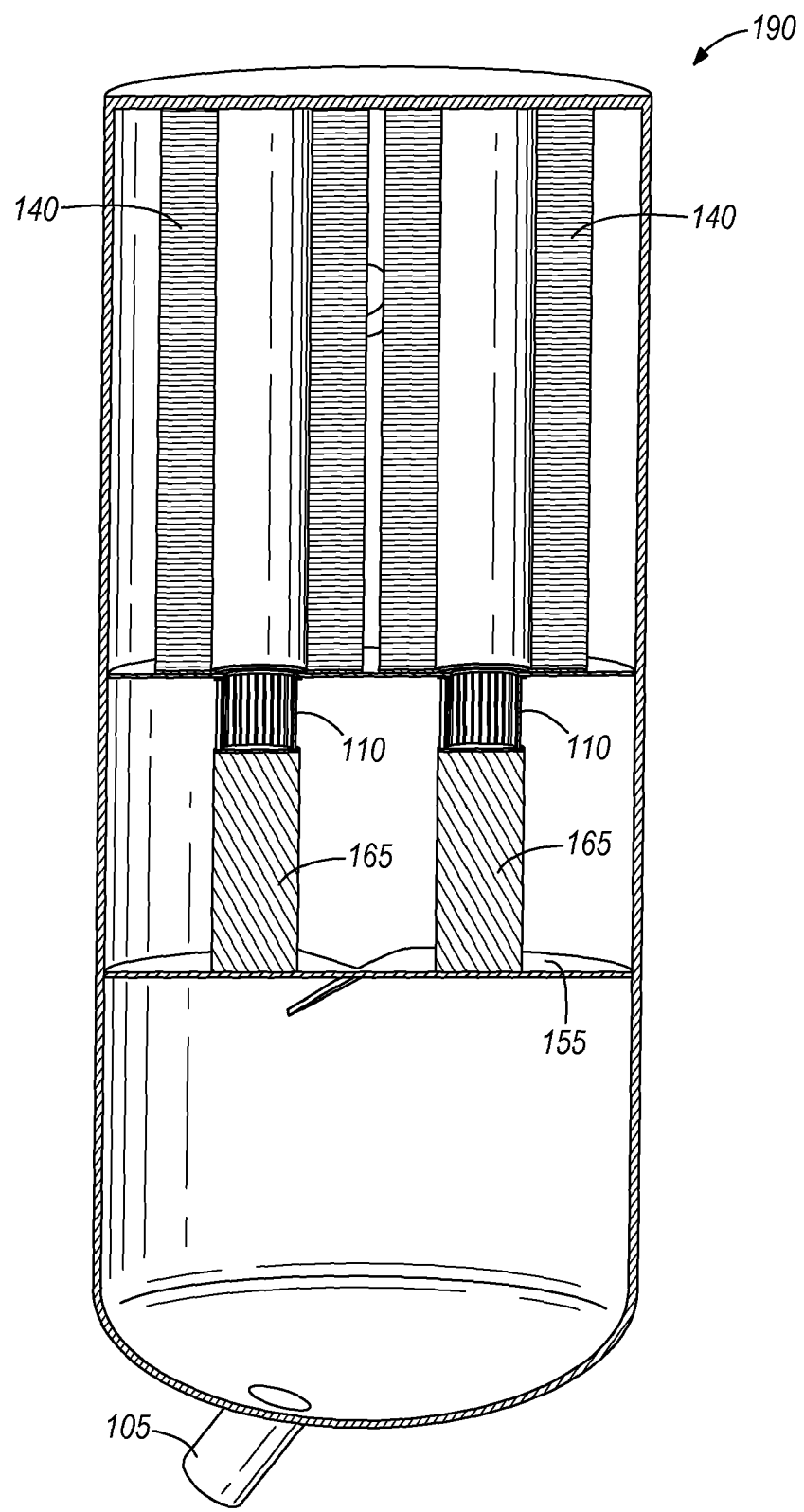
FIG. 6 is a section view of another multi-stage oil separator suitable for use with the compression system of FIG. 1.
Figure 12:
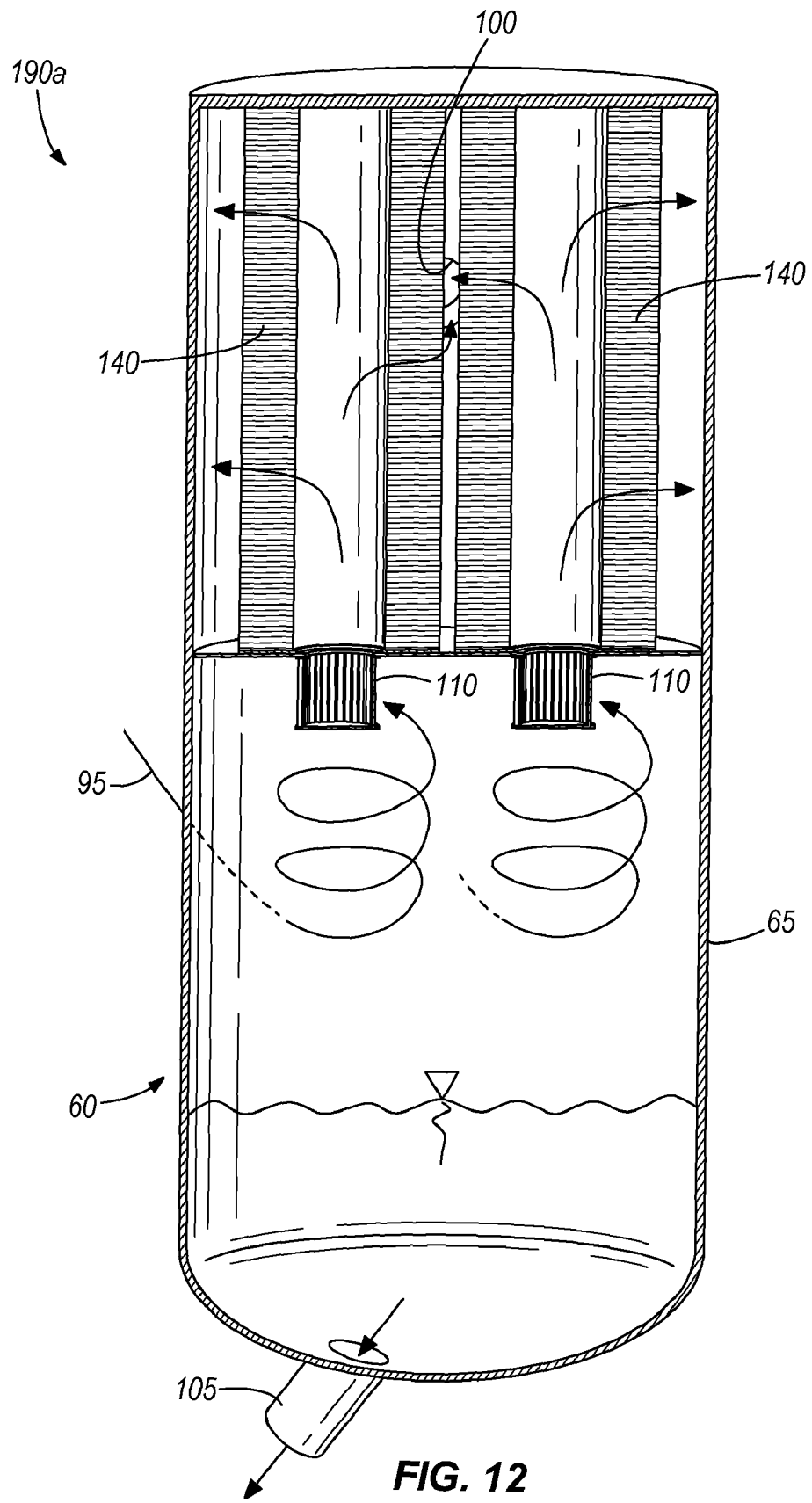
FIG. 12 is a section view of the multi-stage separator of FIG. 6 illustrating the flow paths through the separator.

FIG. 6 illustrates another construction of a separator 190 suitable for use with the system 10 of FIG. 1. The construction of FIG. 6 includes a plurality of coalescing filters 140, a plurality of swirl vane separators 110, and a plurality of center bodies 165. Each of the coalescing filters 140 is positioned above a swirl vane separator 110 and each of the center bodies 165 is positioned beneath one of the swirl vane separators 110. Each of the center bodies 165 is positioned on or coupled to a vortex isolation plate 155. Thus, several stacks consisting of a center body 165, a swirl vane separator 110, and a coalescing filter 140 arranged as illustrated in FIG. 3 are positioned within the housing 60 above the vortex isolation plate 155. This arrangement allows for a greater volume of air-oil to be separated due to the greater flow areas of the additional swirl vane separators 110 and coalescing filters 140. In a similar separator 190a, illustrated in FIG. 12, the vortex isolation plate 155 and the center bodies 165 are omitted.

Figure 7:
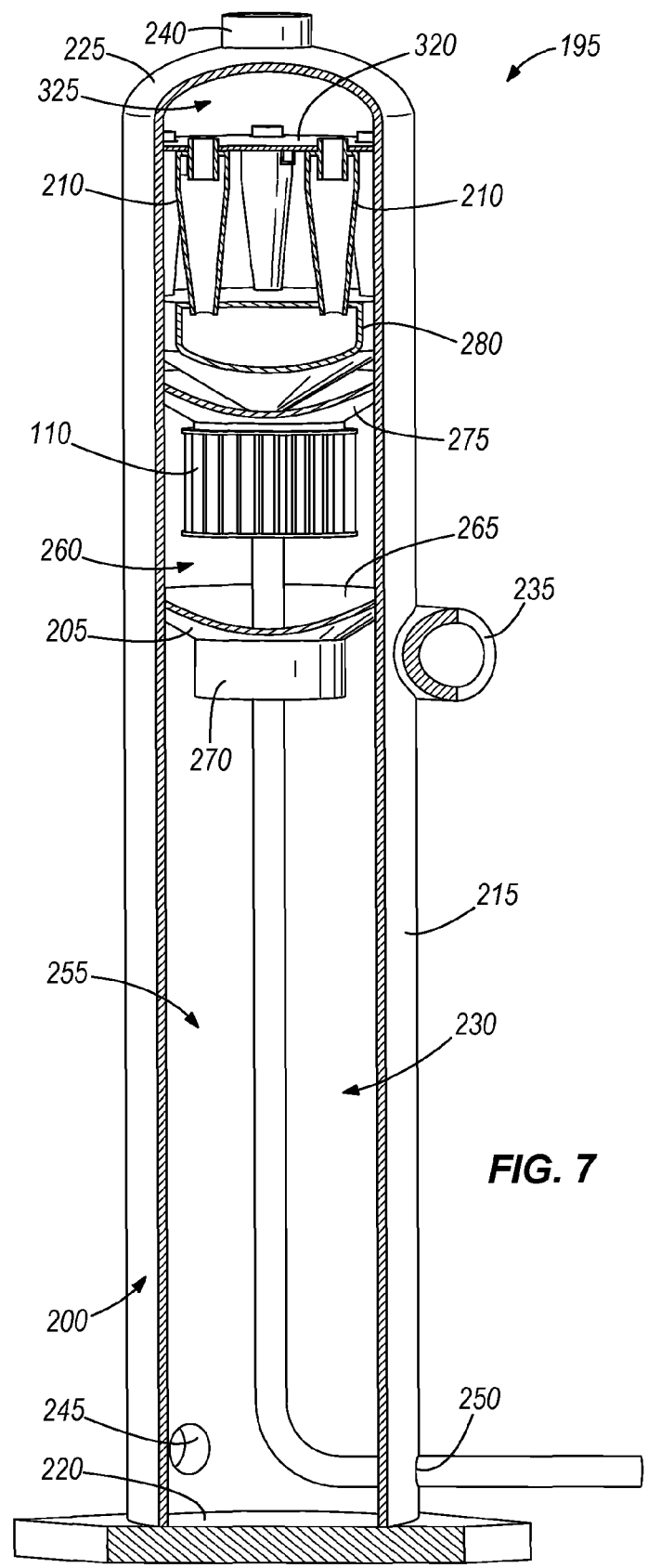
FIG. 7 is a section view of another multi-stage oil separator including multiple individual cyclones that is suitable for use with the compression system of FIG. 1.
Figure 8:
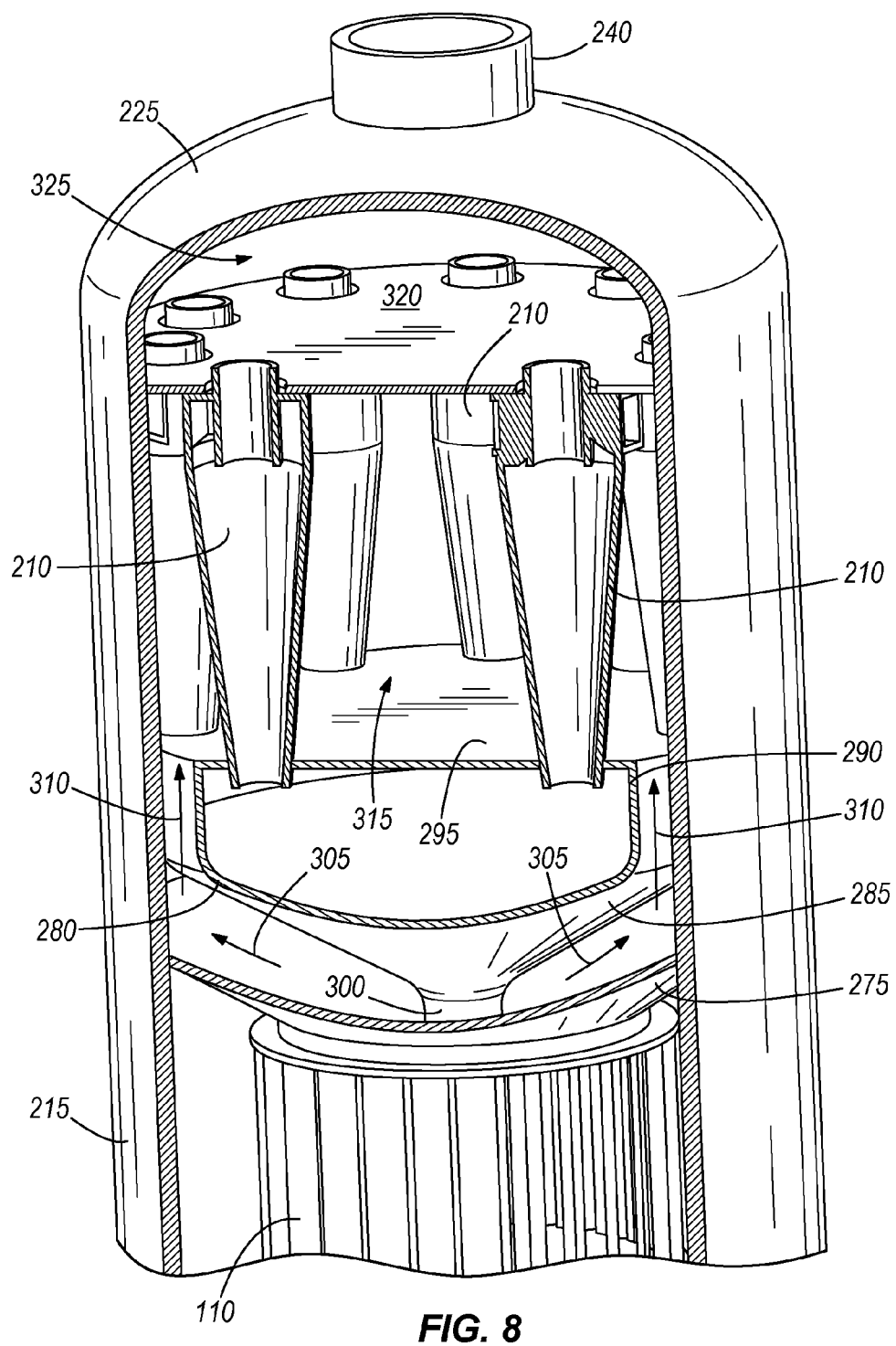
FIG. 8 is a perspective section view of a portion of the multi-stage oil separator of FIG. 7.

FIGS. 7 and 8 illustrate another construction of a separator 195 suitable for use in the system 10 of FIG. 1. The separator 195 includes a housing 200, a divider 205, a swirl vane separator 110, and a plurality of individual cyclone separators 210. The housing 200 is formed to contain the full pressure of the air-oil discharged from the compressor 20 and to contain the separator components. The housing 200 includes a substantially cylindrical wall 215 with a flat bottom surface 220 and a domed top portion 225 that cooperates to enclose a space 230. An inlet 235 is formed in the cylindrical wall 215 and is directed to discharge air-oil into the space 230 along a path that is substantially tangent to the inner surface of the cylindrical wall 215 or tangent to another circle centered within the housing 200. In preferred arrangements, the inlet 235 is also angled between 10 and 30 degrees downward from a horizontal orientation. An air outlet 240 is formed in the domed top portion 225 and two oil outlets 245, 250 are formed in the cylindrical wall 215 near the bottom surface 220.

The divider 205 is positioned within the space 230 to divide the space 230 into a first space 255 and a second space 260. The inlet 235 is positioned to direct air-oil into the first space 255 below the divider 205. The divider 205 includes a frustoconical portion 265 and a cylindrical portion 270 that extends downward from the frustoconical portion 265. The frustoconical portion 265 includes a large diameter portion facing upward to collect separated oil and funnel it toward the cylindrical portion 270. The oil runs down the walls to the cylindrical portion 270 where it is free to drip into the bottom of the housing 200. Air-oil flows into the first space 255 from the inlet 235 and flows in a cyclonic pattern. As discussed with regard to FIG. 2, flow in this pattern functions to separate some oil from the air-oil flow. The air-oil flow then flows upward through the divider 205 into the second space 260.

FIG. 8 is an enlarged view of the second space 260 and illustrates a swirl van separator 110 positioned above the divider 205. A conical collector 275 is disposed within the upper ring 120 of the swirl vane separator 110 and includes an outer diameter that contacts the cylindrical wall of the housing 200 and provides a seal therebetween. The collector 275 includes a small end that is disposed within the upper ring 120 of the swirl vane separator 110 and provides a seal therebetween. Thus, air-oil flowing upward in the separator 195 passes through the swirl vane separator 110 where additional oil is separated from the air-oil mixture.

An enclosed collector 280 is positioned within the conical space of the conical collector 275. The enclosed collector 280 includes a conical lower surface 285, a cylindrical wall 290, and a substantially planar top surface 295. A tube 300 engages a small opening at the bottom of the enclosed collector 280 and extends downward through the conical collector 275, the swirl vane separator 110, and the divider 205. The tube 300 extends to the bottom of the housing 200 and exits through one of the oil outlets 245, 250.

The conical lower surface 285 cooperates with the conical collector 275 to define an annular conical flow path 305 through which the air-oil mixture exits the swirl vane separator 110. The cylindrical wall 290 of the conical collector 275 cooperates with the cylindrical wall 290 of the housing 200 to define a vertical annular flow path 310 for the air-oil. The vertical annular path 310 directs the air-oil mixture upward into an individual cyclone space 315.

A top support plate 320 cooperates with the planar top surface 295 to define the individual cyclone space 315 while the top support plate 320 and the top domed surface 225 of the housing 200 cooperate to define an air outlet space 325. Several individual cyclone separators 210 are disposed within the individual cyclone space 315 and operate as the last stage of separation within the separator 195.

Figure 9:
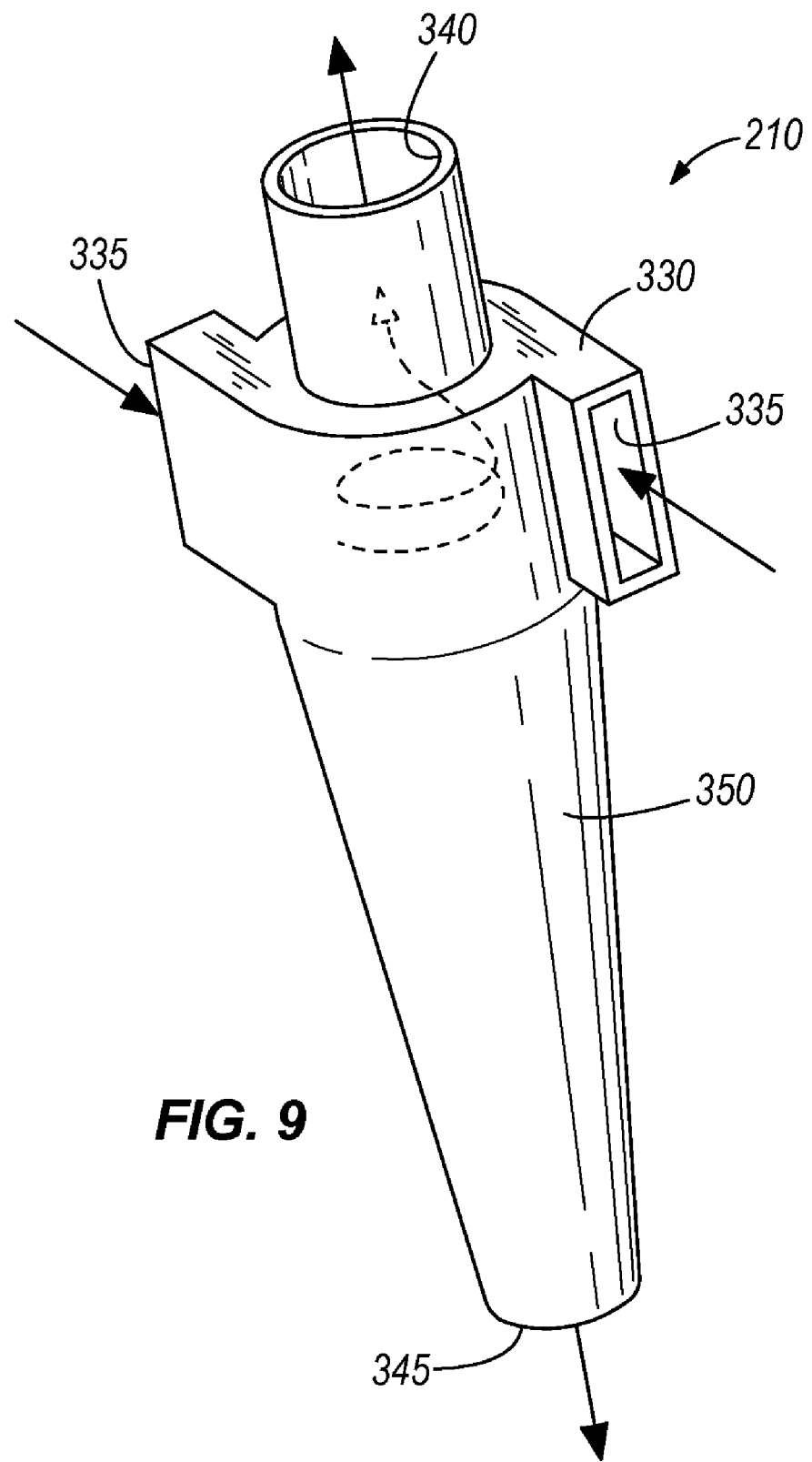
FIG. 9 is a perspective view of an individual cyclone of FIG. 8 illustrating the flow paths through the individual cyclone.

FIG. 9 illustrates one of the individual cyclone separators 210. Each separator 210 includes an inlet portion 330 that includes two air-oil inlets 335 arranged tangent to an inner cylindrical surface such that air-oil admitted into the individual cyclone separators 210 flows in a cyclonic pattern that is counterclockwise when viewed from above. The individual cyclone separator 210 also includes an air outlet 340 near the top and an oil outlet 345 near the bottom. A frustoconical portion 350 extends from the inlet portion 330 to the oil outlet 345.

As illustrated in FIG. 8, the oil outlet 345 of each of the individual cyclone separators 210 is positioned beneath the top planar surface 295 of the enclosed collector 280 such that oil is discharged from the oil outlet 345 into the enclosed collector 280. The air outlet 340 is disposed above the top support plate 320 such that substantially oil free air discharged from the individual cyclone separators 210 collects in the air outlet space 325 and is ultimately discharged from the separator 175 to the point of use.

Figure 10:
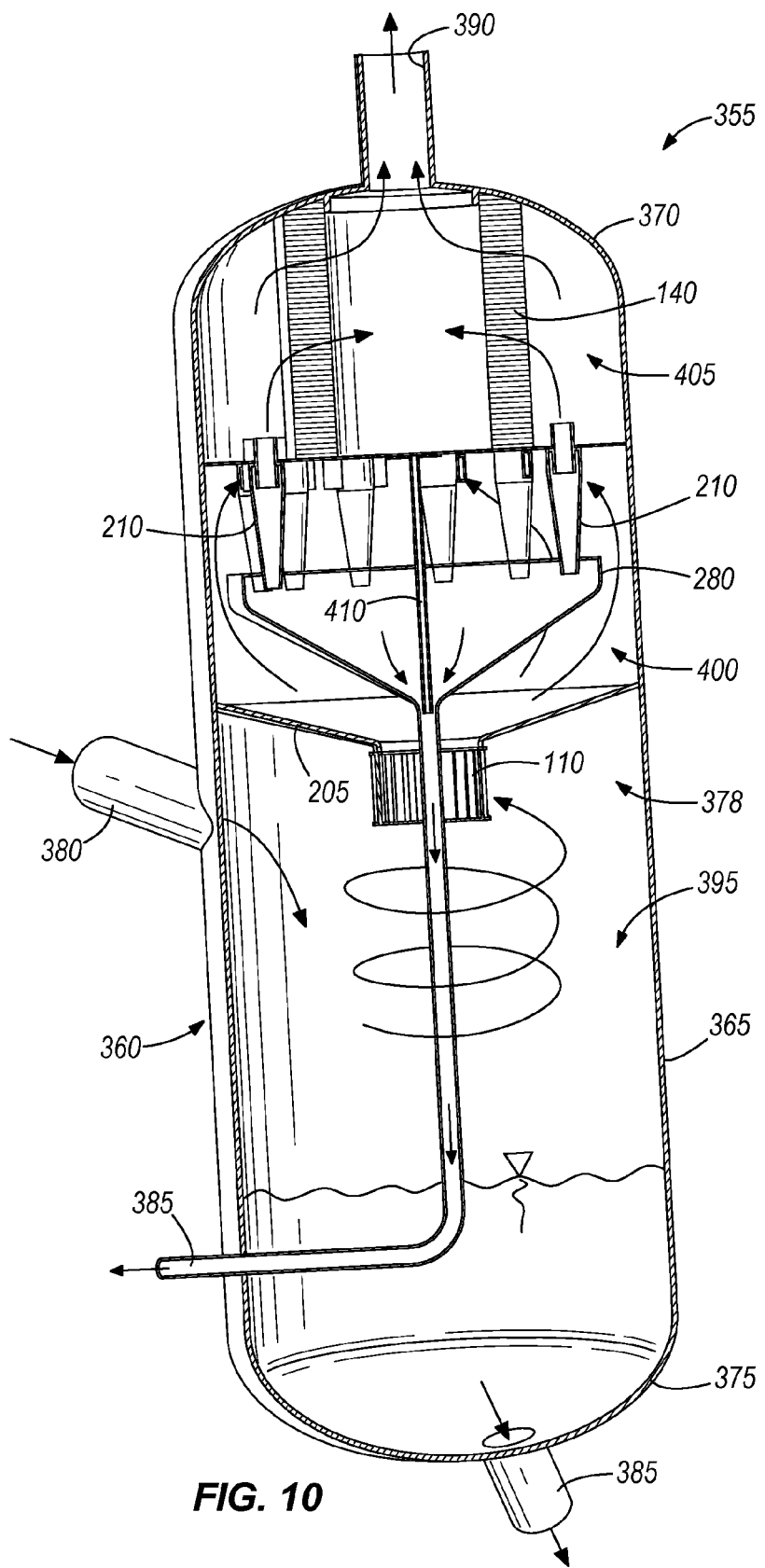
FIG. 10 is a section view of another multi-stage oil separator similar to the separator of FIG. 8 and including a coalescing filter and suitable for use with the compression system of FIG. 1.

FIG. 10 illustrates another construction of a multi-stage separator 355 that utilizes a housing 360 similar to that of FIGS. 7 and 8. Specifically, the housing 360 includes a cylindrical wall 365, a domed top surface 370, and a domed lower surface 375 that cooperate to enclose a space 378 and contain the full pressure produced by the compressor system 10. An air-oil inlet 380 is formed in the cylindrical wall 365, an oil outlet 385 is formed in the lower domed surface 375, and an air outlet 390 is formed in the domed top surface 370. A conical divider 205 is positioned within the space 378 to separate the space 378 into a first space 395 and a second space 400. The divider 205 includes a large diameter portion sized to contact the cylindrical wall 365 of the housing 360 to define a seal therebetween. A small diameter portion of the conical divider 205 is disposed below the large diameter portion and defines an aperture that provides for fluid communication between the first space 395 and the second space 400.

The air-oil inlet 380 is formed in the cylindrical wall 365 and is angled to admit air-oil into the first space 395 in a downward direction and along a path that is substantially tangent to a circle centered on the longitudinal axis 78 of the housing 360. The inlet 380 is angled downward between 10 and 30 degrees with respect to a line normal to the longitudinal axis 78. As illustrated in FIG. 10, the air-oil mixture that enters the first space 395 flows in a cyclonic path that is substantially counterclockwise when viewed from above. As discussed with regard to FIG. 2, the cyclonic flow operates to separate a portion of the oil from the air-oil mixture.

A swirl vane separator 110 is connected to the conical divider 205 adjacent the aperture such that air-oil from the first space 395 passes through the swirl vane separator 110 to enter the second space 400. As discussed, the swirl vane separator 110 forces the air-oil flow to change direction and separates another portion of the oil from the air-oil mixture.

An enclosed collector 280 is positioned within the second space 400 above the conical divider 205. The air-oil mixture that passes through the swirl vane separator 110 flows around the enclosed collector 280 into an individual cyclone space 315. A top support plate 320 cooperates with the enclosed collector 280 to define the individual cyclone space 315. As with the construction of FIGS. 7 and 8, the individual cyclone space 315 includes a plurality of individual cyclones 210 as illustrated in FIG. 9. The individual cyclones 210 include inlets 335 that receive the air-oil mixture and an oil outlet 345 that discharges separated oil into the enclosed collector 280 as described with regard to FIGS. 7 and 8.

The air outlets 340 of the individual cyclone separators 210 are arranged to discharge the air-oil mixture into an upper space 405 defined between the top support plate 320 and the domed upper surface 370. A coalescing filter 140 is disposed in the upper space 405 and extends between the top support plate 320 and the domed upper surface 370. Air-oil discharged by the individual cyclone separators 210 is discharged outside of the coalescing filter 140 with the air outlet 390 of the separator 355 disposed inside of the coalescing filter 140. Thus, the air-oil mixture flows through the coalescing filter 140 which removes most of the remaining oil such that the air discharged from the outlet 385 is substantially oil free.

The oil separated by the coalescing filter 140 collects on the top support plate 320 within the coalescing filter 140. An aperture is formed in the top support plate 320 to allow the collected oil to drain from the upper space 405. A tube 410 connects to the top support plate 320 and extends into the enclosed collector 280 to allow the oil to drain into the enclosed collector 280, thereby reducing re-entrainment of the oil.

In operation and with reference to FIG. 2, the air-oil mixture enters the housing 60 via the inlet 95. The inlet 95 is angled to induce a cyclonic flow pattern in a downward direction. The cyclonic flow serves to separate a portion of the oil from the air-oil mixture. The oil collects in the bottom of the housing 60 and the remaining air-oil mixture flows upward to the swirl vane separator 110. The swirl vane separator 110 forces the flow of air-oil to make a large directional change which serves to separate additional oil. The air-oil mixture flows through the narrow openings in the swirl vane separator 110 such that oil in the mixture contacts and sticks to the surface, thereby separating additional oil. The oil drains from the swirl vane separator 110 and drips into the bottom of the housing 60. The air-oil mixture flows upward into the cylindrical space 145 within the coalescing filter 140 after it passes through the swirl vane separator 110. The air-oil mixture then passes through the annular wall of the coalescing filter 140 which acts to separate most of the remaining oil from the air-oil mixture. The now virtually oil free air (less than 10 parts per million oil) collects in the space outside of the coalescing filter 140 where it is ultimately discharged from the housing 60 to a point of use. Oil separated by the coalescing filter 140 flows downward through the swirl vane separator 110 and drips into the bottom of the housing 60 where the oil is collected and ultimately discharged for reuse in the compressor system 10.

The constructions of FIGS. 3-6 operate in much the same manner but include additional components that enhance the effectiveness of the separation or that reduce the likelihood of re-entrainment of separated oil into the air-oil mixture. For example, the construction of FIG. 3 includes a vortex isolation plate 155 that separates the separated oil from the high velocity cyclonic flow to reduce re-entrainment of already separated oil.

The construction of FIG. 4 adds a conical baffle 175 that separates the cyclonic flow from the swirl vane separator 110 to induce additional directional changes in the flow to enhance separation. The construction of FIG. 6 adds multiple swirl vane separators 110 and coalescing filters 140 to increase the available surface area and enhance separation.

The construction of FIGS. 7 and 8 includes a first stage of separation similar to that of the construction of FIGS. 2-6. Specifically, the flow of air-oil is admitted into the housing 200 in a way that establishes a cyclonic flow. The cyclonic flow separates a portion of the oil from the air-oil mixture. The air-oil mixture then flows upward through the conical divider 205 to the swirl vane separator 110. The swirl vane separator 110 operates as described with regard to FIGS. 2-6 to further separate oil from the air-oil mixture. The separated oil drips down from the swirl vane separator 110 onto the conical divider 205. The oil flows down the conical divider 205 and drips into the bottom of the housing 200. The remaining air-oil mixture flows upward through the swirl vane separator 110 and through the space between the conical divider 205 and the enclosed collector 280. The mixture of air-oil collects in the individual cyclone space 315 where it enters one of the plurality of available individual cyclone separators 210. The individual cyclone separators 210 each establish a cyclonic flow that is forced downward by the narrowing path within the individual cyclone separators 210. As the flow moves downward, it accelerates, thereby separating additional oil. The oil flows into the enclosed collector 280 where it is directed via a tube 300 to an oil outlet 385 near the bottom of the housing 200. Eventually, the space becomes too small for the air flow and the air flows upward through the center of the cyclone. The now substantially oil free air exits from the top of the individual cyclone separators 210 and is discharged from the housing 200.

The construction of FIG. 10 is similar to the construction of FIGS. 7 and 8 and adds a coalescing filter 140 downstream of and above the individual cyclone separators 210. The air-oil mixture exits the individual cyclone separators 210 and flows through the coalescing filter 140 to separate additional oil. The substantially oil free air travels out of the housing 200 to the point of use, while the separated oil collects near the bottom of the coalescing filter 140. The oil drains into the enclosed collector 280 via a tube 410. From the enclosed collector 280, the oil flows down a second tube 300 and out of the housing 200.

Thus, the invention provides, among other things, a multi-stage oil separator disposed in a single housing. Various features and advantages of the invention are set forth in the following claims.

What is claimed is:

1. A separator for separating a liquid-gas flow into a liquid and a compressed gas, the separator comprising:
   a housing defining an inner space and adapted to contain the full pressure of the compressed gas, the housing including a liquid-gas inlet, a liquid outlet, and a gas outlet;
   a first stage separator positioned to receive the liquid-gas flow from the inlet, the first stage separator operable to separate a first portion of the liquid from the liquid-gas flow;
   a second stage separator including a swirl vane separator positioned to receive the liquid-gas flow from the first stage separator and operable to separate a second portion of the liquid from the liquid-gas flow; and
   a third stage separator positioned to receive the liquid-gas flow from the swirl vane separator and operable to separate a third portion of the liquid from the liquid-gas flow, the third stage separator including an individual cyclone separator having an inlet, a gas outlet, a liquid outlet, and a frustoconical portion extending between the inlet and the liquid outlet, wherein the first stage separator, the second stage separator, and the third stage separator are completely contained within the housing.

2. The separator of claim 1, wherein the first portion of the liquid, the second portion of the liquid, and the third portion of the liquid exit the separator through the liquid outlet.

3. The separator of claim 1, wherein the first stage separator includes a cyclonic separator at least partially formed as part of the housing.

4. The separator of claim 1, further comprising a divider plate positioned to divide the inner space into a first space and a second space, the first separator positioned within the first space, the third separator positioned within the second space, and the swirl vane separator positioned to direct the liquid-gas flow from the first space to the second space.

5. The separator of claim 4, further comprising a vortex isolation plate positioned within the first space to divide the first space into an upper first space and a lower first space.

6. The separator of claim 1, wherein the third stage separator includes a coalescing filter.

7. The separator of claim 1, wherein the third stage separator includes a plurality of individual cyclone separators, wherein each of the cyclone separators includes a liquid-gas inlet, a liquid outlet, and a gas outlet, the liquid-gas inlet arranged to induce a cyclonic flow within each individual cyclone separator.

8. The separator of claim 7, further comprising an enclosed collector including a collector outlet, the enclosed collector positioned to receive a flow of liquid from each of the individual cyclone separators and to direct that flow to the liquid outlet via the collector outlet.

9. The separator of claim 7, further comprising a fourth stage separator positioned within the housing to receive the liquid-gas flow from the third stage separator and operable to separate a fourth portion of the liquid from the liquid-gas flow, wherein the fourth stage separator includes a coalescing filter.

10. A separator for separating a liquid-gas flow into a liquid and a compressed gas, the separator comprising:
    a housing defining an inner space and adapted to contain the full pressure of the compressed gas, the housing including a liquid-gas inlet, a liquid outlet, and a gas outlet;
    a first stage separator positioned to receive the liquid-gas flow from the inlet, the first stage separator operable to separate a first portion of the liquid from the liquid-gas flow;
    a second stage separator including a swirl vane separator positioned to receive the liquid-gas flow from the first stage separator and operable to separate a second portion of the liquid from the liquid-gas flow;
    a third stage separator positioned to receive the liquid-gas flow from the swirl vane separator and operable to separate a third portion of the liquid from the liquid-gas flow, wherein the first stage separator, the second stage separator, and the third stage separator are completely contained within the housing
    a divider plate positioned to divide the inner space into a first space and a second space, the first separator positioned within the first space, the third separator positioned within the second space, and the swirl vane separator positioned to direct the liquid-gas flow from the first space to the second space;
    a vortex isolation plate positioned within the first space to divide the first space into an upper first space and a lower first space; and
    a center body that extends between the swirl vane separator and the vortex isolation plate.

11. A separator for separating a liquid-gas flow into a liquid and a compressed gas, the separator comprising:
    a housing defining an inner space and adapted to contain the full pressure of the compressed gas, the housing defining a longitudinal axis and including a liquid-gas inlet, a liquid outlet, and a gas outlet, wherein the liquid-gas inlet is angled at an oblique angle with respect to the longitudinal axis;
    a first stage separator including a cyclonic separator formed as part of the housing, the cyclonic separator operable to separate a first portion of the liquid from the liquid-gas flow;
    a second stage separator including a swirl vane separator positioned to receive the liquid-gas flow from the first stage separator and operable to separate a second portion of the liquid from the liquid-gas flow; and
    a third stage separator including a plurality of individual cyclone separators positioned to receive the liquid-gas flow from the swirl vane separator and operable to separate a portion of the liquid from the liquid-gas flow.

12. The separator of claim 11, wherein the first stage separator, the second stage separator, and the third stage separator are completely contained within the housing.

13. The separator of claim 11, wherein the first portion of the liquid, the second portion of the liquid, and the third portion of the liquid exit the separator through the liquid outlet.

14. The separator of claim 11, further comprising a divider plate positioned to divide the inner space into a first space and a second space, the first separator positioned within the first space, the third separator positioned within the second space, and the swirl vane separator positioned to direct the liquid-gas flow from the first space to the second space.

15. The separator of claim 14, further comprising a vortex isolation plate positioned within the first space to divide the first space into an upper first space and a lower first space.

16. The separator of claim 11, wherein the third stage separator includes a plurality of individual cyclone separators, wherein each of the cyclone separators includes a liquid-gas inlet, a liquid outlet, and a gas outlet, the liquid-gas inlet arranged to induce a cyclonic flow within each individual cyclone separator.

17. The separator of claim 16, further comprising an enclosed collector including a collector outlet, the enclosed collector positioned to receive a flow of liquid from each of the individual cyclone separators and to direct that flow to the liquid outlet via the collector outlet.

18. The separator of claim 16, further comprising a fourth stage separator positioned within the housing to receive the liquid-gas flow from the third stage separator and operable to separate a fourth portion of the liquid from the liquid-gas flow, wherein the fourth stage separator includes a coalescing filter.

19. The separator of claim 11, wherein the liquid-gas inlet is angled between about 10 and 30 degrees downward with respect to the longitudinal axis.

20. A separator for separating a liquid-gas flow into a liquid and a compressed gas, the separator comprising:
    a housing defining an inner space and adapted to contain the full pressure of the compressed gas, the housing defining a longitudinal axis and including a liquid-gas inlet, a liquid outlet, and a gas outlet;
    a first stage separator including a cyclonic separator formed as part of the housing, the cyclonic separator operable to separate a first portion of the liquid from the liquid-gas flow;
    a second stage separator including a swirl vane separator positioned to receive the liquid-gas flow from the first stage separator and operable to separate a second portion of the liquid from the liquid-gas flow;
    a third stage separator including a plurality of individual cyclone separators positioned to receive the liquid-gas flow from the swirl vane separator and operable to separate a portion of the liquid from the liquid-gas flow
    a divider plate positioned to divide the inner space into a first space and a second space, the first separator positioned within the first space, the third separator positioned within the second space, and the swirl vane separator positioned to direct the liquid-gas flow from the first space to the second space;
    a vortex isolation plate positioned within the first space to divide the first space into an upper first space and a lower first space; and
    a center body that extends between the swirl vane separator and the vortex isolation plate.

* * * * *